Dec. 24, 1968          H. J. L. SMITH          3,417,441
              QUICK RELEASE FASTENERS
                Filed Sept. 29, 1966
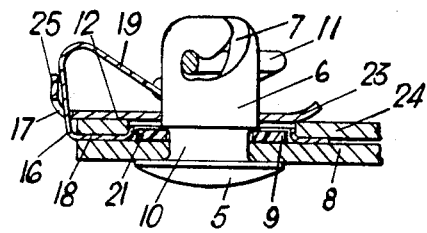
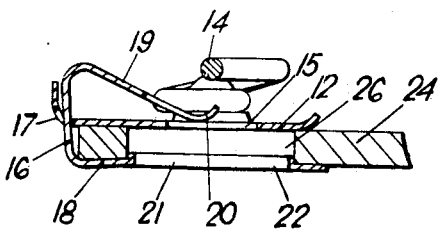
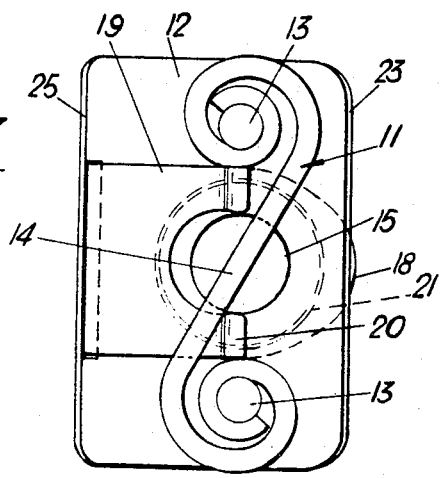
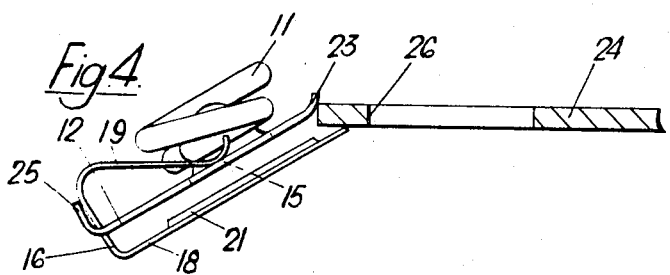
Inventor
HOWARD JOHN LEONARD SMITH
By DANIEL H. KANE
Attorney

United States Patent Office 3,417,441
Patented Dec. 24, 1968

3,417,441
QUICK RELEASE FASTENERS
Howard John Leonard Smith, Farnham, Surrey, England, assignor to Dzus Fastener Co., Inc., West Islip, N.Y., a corporation of New York
Filed Sept. 29, 1966, Ser. No. 583,053
3 Claims. (Cl. 24—221)

ABSTRACT OF THE DISCLOSURE

A mounting for one unit of a fastener assembly, such that it may be quickly and accurately associated with a panel or sheet of material. Such mounting will not require precision drilling of the panel to position the ends of a spring rod in exact relationship with respect to stem-accommodating aperture; the stem forming a part of a second unit of the assembly and cooperating with that rod.

BACKGROUND OF THE INVENTION

Fastener assemblies of the type shown in the United States patent to Dzus, No. 1,955,740, dated Apr. 24, 1934, include two main elements. The first involves a rotatable stud embracing a head and a shank. The latter is formed with a slot presenting camming edges. It is mounted by a panel having an opening. The stud is retained in association with the panel so that its head is exposed on the outer panel face; the shank extending through the plate opening.

The second element includes a panel also formed with an opening. A spring element is mounted on the outer face of that panel by anchoring the spring ends on this face in positions such that the central body or rod portion of the spring extends across the panel in line with its opening.

Therefore, with the panels adjacent each other the central portion of the spring will enter the outer ends of the cam slots of the stud. By turning the latter, the edges defining such slot will exert a camming action to draw the central spring zone towards the stud head and place the spring under tension. This results in the panels being held in face-to-face contact with the spring finally traversing the camming area of the slot and coming to rest in its inner end zone.

Considerable time and expense are involved in precisely drilling the spring mounting panel at points where the spring ends are to be anchored in relation to the aperture. Also, in the case of a large panel difficult manipulation of the latter is required, especially where a whole series of fastener assemblies are necessary.

SUMMARY OF THE INVENTION

These difficulties are overcome by the present teachings which involve the use of a base plate individual to one panel-aperture and stud member. This plate is also apertured and to each side of the opening so formed provides spring anchorage, so that by mounting the ends of a spring element at those points, the center area of that spring will extend across the opening. A clip member is associated with the base plate and serves to secure it against movement with respect to a panel mounting the assembly. It is apparent that the plate and clip assembly may be readily manufactured at a factory in large quantities and at minimum expense. Therefore, the only work required in connection with the mounting panel, will be that of forming the required apertures therein.

A further object of the invention is that of furnishing a simple assembly, which will have a long effective life and be capable of manufacture at minimum expense.

One example of the use of a fastener of the kind described having a retaining member assembly in accordance with the invention is illustrated in the accompanying drawing in which:

FIGURE 1 is a central section through the fastener shown holding two panels together;

FIGURE 2 is a view similar to FIGURE 1 but showing the retaining member assembly fitted to another second panel;

FIGURE 3 is a plan view of the parts shown in FIGURE 2; and

FIGURE 4 illustrates the fitting of the retaining assembly over the edge of the second panel shown in FIGURE 1.

The stud of the fastener has a head 5 conveniently formed with a screwdriver slot and a shank 6 formed at its free end with a helical cam slot 7. As shown in FIGURE 1 the stud may be held rotatably captive in an aperture in a first plate 8 by means of a resilient grommet 9 which is pushed over the shank 6 and snaps into a reduced diameter neck portion 10, thus trapping the part of the plate 8 around the aperture between the head 5 and grommet 9. The foregoing forms one unit of the assembly.

The retaining member assembly consists of an S-shaped wire spring 11 the coiled ends of which are secured on a rectangular base plate 12, by means of two rivets 13, with a rod or straight portion 14 of the wire spring 11 extending diametrically across and above a circular aperture 15 in the base plate 12. A U-shaped spring metal clip 16 is held captive in a slot 17 adjacent to one of the longer edges of the base plate 12 so that one flat arm 18 of the clip overlies one face of the base plate and the other arm 19 converges towards the arm 18 and the other face of the base plate. That arm has at its free edge a pair of legs 20 which lie one on each side of the hole 15 and between it and the rivets 13, or equivalent spring anchors. The arm 18 of the clip 16 is provided with a pressed upstanding annular lip 21 projecting from the edge of a hole 22 co-axially with but larger in diameter than the hole 15. The two longitudinal edges of the base plate 12 are bent outwards, one, 23, to provide an enlarged chamfered entrance to present to an edge of a second panel 24 to which the assembly is to be fitted, and the other, 25, to lie against the base of the U of clip 16 to minimize the projection of the assembly beyond an edge of the second panel 24 to which the assembly is fitted.

As shown in FIGURE 4, the assembly is fitted over the edge of the second panel 24 formed at an appropriate distance from the edge with a circular hole 26 just large enough to receive the projecting annular lip 21 on the arm 18 of the clip. As the clip is pushed on the panel 24, arms 18 and 19 are forced apart sufficiently to provide room between the base plate and the arm 18 to receive the panel 24. In this particular example a second panel thickness lying in the range from 0.036 inch as shown in FIGURE 1 to 0.128 inch as shown in FIGURE 2 can be accommodated. As soon as the projecting lip 21 enters the hole 26 in the second panel 24 the assembly is resiliently held between the clip arm 18 by the co-operation of the lip and edge of the hole against movement in a plane parallel to the face of the panel. The two panels 8 and 24 can then be pressed together face to face so that the shank 6 of the stud passes through the aligned holes 22, 26 and 15 and the grommet 9 is received within the hole 22. Subsequent rotation of the stud from the front of the first panel through 90 degrees traps the straight portion 14 of the spring wire 11 over a dead centre position in the helical cam slot 7 in the stud shank 6.

Thus, among others, the objects of the invention are achieved. It will be apparent that numerous changes in details of structure may be resorted to without departing from the spirit of the concept as defined by the claims.

I claim:

1. A fastener assembly mounting including in combination an apertured base plate, anchoring means supported by said plate at points spaced from its aperture and on opposite sides thereof, a spring rod extending across said aperture with its ends attached to said anchoring means, and a U-shaped clip member of resilient material such that its arms are urged towards each other, said plate being formed with a slot adjacent one of its edges, said clip extending through said slot, with the clip arms respectively over- and underlying the opposite plate faces and having legs formed at the end of one of the clip arms, said legs extending below said spring rod to a point at least midway of the plate aperture and between the latter and the spring anchoring means.

2. In an assembly as defined in claim 1, the other of said arms of said clip having an opening aligned with and of larger size than the plate aperture, said opening being adapted to receive the shank of a stud having means to engage said spring rod so that rotation of the stud with respect to said clip will urge said one clip arm toward said base plate, said clip comprising a lip disposed around said opening to extend in the direction of said plate.

3. A clip member of the form recited in claim 1, in which the other of said arms is formed with an opening in line with the space between said legs, and with a lip encircling said opening and extending toward said legs.

References Cited

UNITED STATES PATENTS

| | | | |
|---|---|---|---|
| 2,506,953 | 5/1950 | Dzus | 24—221 |
| 3,118,480 | 1/1964 | Kreider | 151—41.75 |

BOBBY R. GAY, *Primary Examiner.*

E. SIMONSEN, *Assistant Examiner.*